US005619785A

United States Patent [19]

Tambussi

[11] Patent Number: 5,619,785

[45] Date of Patent: Apr. 15, 1997

[54] METHOD OF MAKING A METAL CASKET

[76] Inventor: William C. Tambussi, 13 Greensward, Cherry Hill, N.J. 08002

[21] Appl. No.: 394,896

[22] Filed: Feb. 27, 1995

[51] Int. Cl.[6] .......... B23P 11/00

[52] U.S. Cl. .......... 29/434; 29/458; 29/527.3; 29/527.5; 164/46; 27/6

[58] Field of Search .......... 29/434, 458, 469, 29/527.3, 527.5; 264/255, 309; 249/144; 425/98, 470; 164/46; 27/3, 6, 19

[56] References Cited

U.S. PATENT DOCUMENTS

| | | | |
|---|---|---|---|
| 743,395 | 11/1903 | McGuire | 27/6 |
| 1,711,542 | 5/1929 | Rosenqvist | 27/3 |
| 2,171,599 | 9/1939 | Reid . | |
| 2,629,907 | 3/1953 | Hugger . | |
| 3,506,057 | 4/1970 | Pennock et al. . | |
| 3,784,451 | 1/1974 | Garner . | |
| 3,826,301 | 7/1974 | Brooks . | |
| 4,827,581 | 5/1989 | Davidian | 27/3 |
| 4,928,745 | 5/1990 | Feest et al. . | |
| 4,983,427 | 1/1991 | Sansome et al. . | |
| 5,171,360 | 12/1992 | Orme et al. . | |
| 5,296,178 | 3/1994 | Sugihara et al. . | |
| 5,449,483 | 9/1995 | Greenwood et al. | 164/46 |

FOREIGN PATENT DOCUMENTS

| | | | |
|---|---|---|---|
| 289409 | 12/1915 | Germany | 27/3 |

*Primary Examiner*—David P. Bryant
*Attorney, Agent, or Firm*—Norman E. Lehrer

[57] ABSTRACT

A method of fabricating a metal casket by assembling a body containment mold and a lid mold. Each of the molds has inner and outer surfaces. A release mechanism is separately applied to the surfaces of each of the molds. A body containment compartment is formed by depositing a layer of metal on the inner surface of the body containment mold until a desired thickness is achieved. A lid component is formed by depositing a layer of metal on the inner surface of the lid mold until a desired thickness is achieved. Structural polymeric material is then applied to the inner surfaces of the body containment compartment and the lid component. Thereafter, the body containment compartment and the lid component are removed from their respective molds and are hingedly connected to one another.

7 Claims, 3 Drawing Sheets

METHOD OF MAKING A METAL CASKET

BACKGROUND OF THE INVENTION

This invention relates to caskets or coffins used to house the remains of once living organisms. More particularly, this invention is directed toward an economical and leak proof metal casket and a method for making the same.

Caskets have long been known and used for the burial of deceased persons. The use of metal caskets has become increasingly prevalent. Typically, metal caskets are fabricated in a sectionalized fashion. The different sections are commonly stamped from sheet metal and formed on a brake. Stamped metal caskets require the use of bulky machinery and heavy dies. The casket is comprised of a bottom, two sides, two ends and a lid. The sections are welded at the joints and seams. Once joined, the casket is ground and sanded until a smooth and cosmetically acceptable surface is obtained. Needless to say, the aforementioned stamped metal process is expensive as well as labor intensive.

Metal caskets, in general, are subject to deterioration by organic acids created by the decomposing corpses contained therein as well as corrosion from oxidation. The organic acids and oxidation attack and corrode the metal casket resulting in the subsequent leakage of fluids.

Another drawback with caskets formed by conventional techniques is that it is difficult to construct caskets that have intricate shapes and details.

SUMMARY OF THE INVENTION

The present invention is designed to overcome the deficiencies of the prior art discussed above. It is an object of the invention to provide a molded metal casket that is essentially leak proof.

It is another object of the invention to provide such a casket that is easy and relatively inexpensive to manufacture.

In accordance with the illustrative embodiments, demonstrating features and advantages of the present invention, there is provided a metal casket that comprises a body containment compartment and a lid component. The body containment compartment and the lid component are molded as a single uniform distinct piece. The body containment compartment is formed by first assembling a mold. The interior surface of the assembled mold is treated with a release mechanism in the form of a conformable barrier film or coating. After the release mechanism dries, molten metal is deposited on the interior surface of the mold. Structural polymeric material is then applied over the deposited metal. The polymeric material acts as a support to add cross-sectional thickness so that the body containment compartment can be self-supporting. The lid component is formed in a similar manner in a corresponding mold. Once the body containment compartment and the lid compartment are removed from their respective molds, they are hingedly connected to one another. Handles are either mounted to the outside of the casket or they are molded as an integral part of the same.

By preparing a casket by this method, the body containment compartment and the lid component are each formed as one uniform piece. Since there are no seams, joints or welds, the possibility of leakage is reduced. Moreover, the number of steps required to manufacture such a casket is minimized.

Other objects, features and advantages will be readily apparent from the following detailed description of a preferred embodiment thereof taken in conjunction with the drawings.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DETAILED DESCRIPTION OF THE PREFERRED EMBODIMENTS

Figure 1:
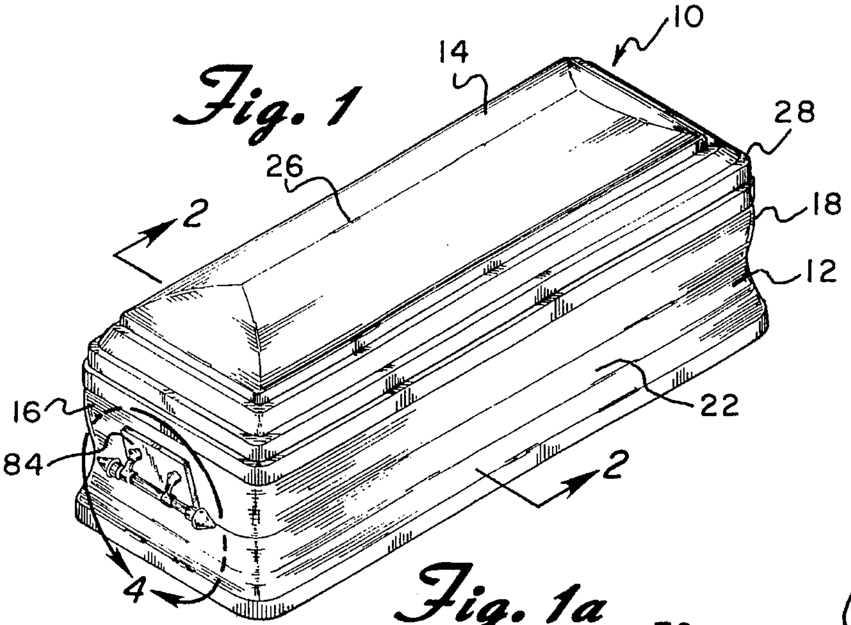
FIG. 1 is a perspective view of a full lid metal casket constructed in accordance with the principles of the present invention.

Referring now to the drawings in detail wherein like reference numerals have been used throughout the various figures to designate like elements, there is shown in FIG. 1 a perspective view of a metal casket constructed in accordance with the principles of the present invention and designated generally as 10. While the invention is described with regards to a metal casket and a method for making the same, its use is not limited thereto. For example, the same method can be employed to manufacture memorial markers, casket hardware, urns and/or vaults.

The casket 10 is comprised essentially of a body containment compartment 12 and a lid component 14. The body containment compartment has two opposing ends 16 and 18, two opposing sides 20 and 22, a bottom 24 and a return flange 25 (see FIGS. 1 and 2). The lid component 14 has a crown portion 26, a rim portion 28 and a return flange 29.

Figure 5:
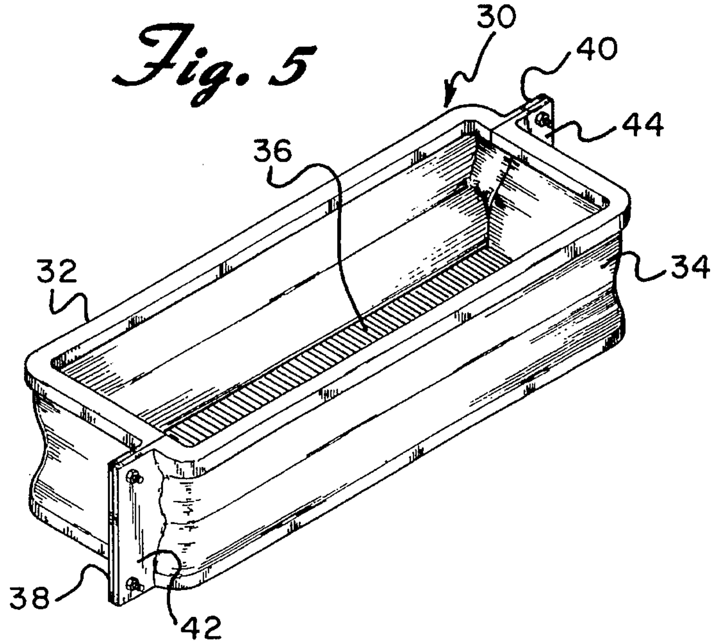
FIG. 5 is a perspective view of a body containment mold.

The body containment compartment 12 is formed by first assembling a mold 30 as illustrated in FIG. 5. The mold 30 contains a first side wall 32, a second side wall 34 and a bottom 36. First side wall 32 has a pair of flanges 38 and 40 extending from opposite ends thereof. Similarly, second side wall 34 has a pair of flanges 42 and 44 extending from opposite ends thereof. When the mold 30 is assembled, flange 38 of first side wall 32 is mated with flange 42 of second side wall 34. The flanges 38 and 42 are releasably secured to one another in any suitable manner such as by bolting or clamping the flanges to one another. Flanges 40 and 44 are secured to one another in a similar fashion.

The assembled mold 30 is contoured to be the negative of the body containment compartment 12. Accordingly, when the metal is deposited on the interior surface of the mold, the desired shape of the body containment compartment 12 will be obtained as more fully described below.

Once the mold 30 is assembled, a release mechanism (not shown) in the form of a conformable barrier film or coating is applied to the interior surface of the same. A preferred release mechanism is an aqueous polyvinyl alcohol solution. However, a variety of other release mechanisms can be employed. The release mechanism is thinly applied to the entire interior surface of the mold 30 in order to facilitate the removal of the casket 10 from the mold 30 once the metal is deposited thereon.

Figure 6:
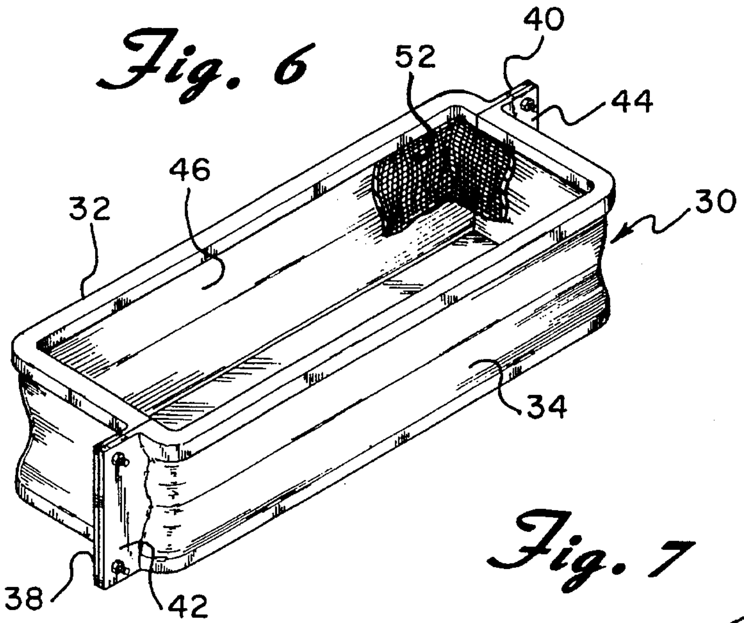
FIG. 6 is a perspective view of the body containment mold with a metal body containment compartment deposited therein.

Metal 46 is then deposited over the interior surface of the mold 30 as illustrated in FIG. 6. Preferred metals for deposition are zinc, copper or brass alloys. However, a variety of other low melting point metals and metal alloys can be employed. The metal is preferably sprayed onto the interior surface of the mold. Although, the metal can be deposited in other ways such as by pouring the same under pressure in conforming molds. In order to spray the metal or metal alloy onto the mold, a spraying apparatus (not shown) well known in the art is utilized. More specifically, the metal or metal alloy is first heated to a temperature above its melting point. The molten metal is then converted into a spray of particles by atomizing the same. The sprayed particles are then deposited onto the interior surface of the mold 30. The metal 46 is built up until a desired level of thickness is achieved. More specifically, the metal is deposited into the mold to a thickness commensurate with the stress levels and the load bearing requirements of the particular casket being formed. The preferred thickness is in the range of about ⅛ to ½ inch although there may be circumstances when it would be desirable to increase or decrease this thickness.

Figure 2A:
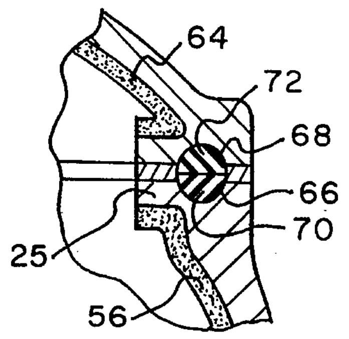
FIG. 2*a* is a cross-sectional view showing grooves formed in the return flanges.
Figure 2:
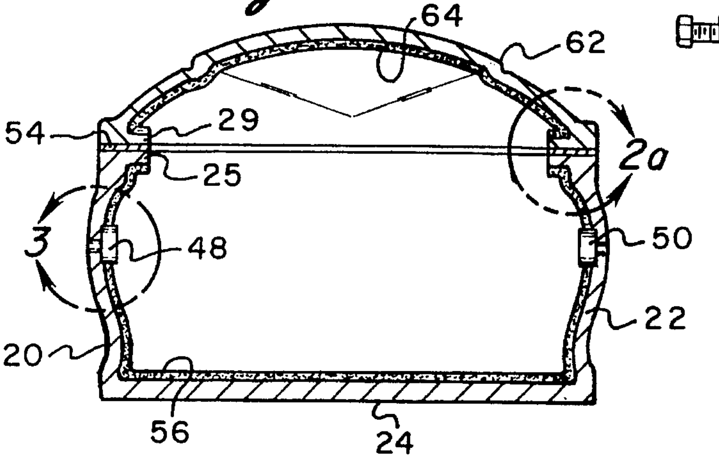
FIG. 2 is a cross-sectional view taken along lines 2—2 of FIG. 1.

In the embodiment shown in FIG. 2, attachments 48 and 50 are strategically attached to the body containment compartment 12. This is accomplished by first positioning the attachments on the mold 30 in the desired location. Thereafter, metal is deposited over the attachments and the mold. Internal threaded recesses are formed in the attachments in order to facilitate the subsequent attachment of hardware as more fully described below.

In the preferred method, localized reinforcement 52 is applied to strategic areas of the body containment compartment such as the corners as shown in FIG. 6. The localized reinforcement 52 is achieved by attaching wire mesh around the upper corners of the body containment compartment 12 after the metal has been deposited. Metal is then deposited over the wire mesh to provide the requisite reinforcement. The wire mesh can be comprised of metal, plastic or composite materials. It should be noted that other suitable reinforcement can be applied in place of the wire mesh.

After the deposited metal 46 is allowed to cool to room temperature, a metal frame stiffener 54 is applied to provide adequate strength for subsequent attachment of lid component 14 (see FIG. 2). The frame stiffener is applied to the upper edge portion of the side 20 of the body containment compartment 12. The frame stiffener 54 is preferably made of a metal with a similar coefficient of thermal expansion (CTE) as the metal layer 46. Other frame stiffeners can be applied wherever necessary to increase the strength of the body containment compartment 12.

Thereafter, structural polymeric material 56 is applied to the interior of the body containment compartment 12 (see FIG. 2). The polymeric material seals the casket 10 and serves as a supporting structural layer to add cross-sectional thickness. The polymeric material also provides a dampening effect to the deposited metal and acoustically reduces the noise level emanating from the bed components and gas buildup from the remains inside the casket. Furthermore, the polymeric material 56 acts as a liner to prevent corrosion of the metal casket by organic acids to be contained therein. The polymeric material is applied by first bringing the same into a liquid state. It is then applied to the inner surface of the casket by spraying, injection molding or the like. The polymeric material can be comprised of polyurethane, epoxy, polyesters or a variety of other polymers or copolymers and fillers. The preferred thickness of the polymeric material is in the range of between ⅛ to ½ inch. Under some circumstances, however, it may be desirable to increase the thickness of the applied polymeric material.

Once the polymeric material 56 is applied, the body containment compartment 12 is removed from the mold 30, and the appropriate locking mechanisms and hinges (not shown) are then installed. Thereafter, the exterior of the compartment 12 is buffed and polished in a manner well known in the art.

Figure 7:
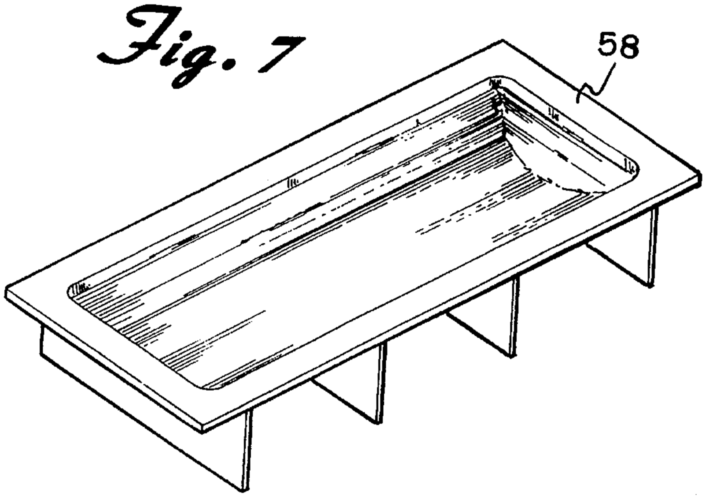
FIG. 7 is a perspective view of a lid mold.

The lid component 14 is formed in a substantially similar manner as the body containment compartment 12. More specifically, a lid mold 58, having the contour of the negative of the lid component 14, is utilized (see FIG. 7). The lid mold 58 is prepared by applying a release mechanism to the interior surface thereof. Again, the preferred release mechanism is polyvinyl alcohol.

Figure 8:
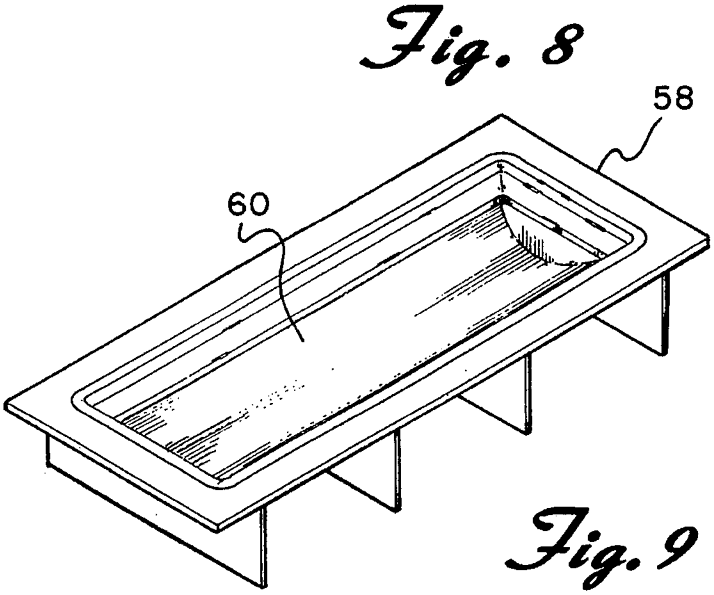
FIG. 8 is a perspective view of the lid mold with a metal lid component deposited therein.

Metal 60 is then deposited in layered form, preferably by spraying the same, over the interior surface of the mold 54 as illustrated in FIG. 8. Preferred metals for deposition are zinc, copper or brass alloys. The metal is sprayed onto the interior of the mold 58 until a desired thickness is achieved. It should be noted that the crown portion 26 of the lid component 14 can be comprised of a different metal or metal alloy than the rim portion 28 simply by spraying the two portions with different metal compositions.

Moreover, a wide variety of lid shapes can be obtained by the utilization of the metal deposition process. This is because molds of various configurations can be employed. For example, the crown portion 26 of the lid can have a highly defined ridge 62 as shown in FIG. 2. Besides being aesthetically pleasing, the ridge serves as a line of demarcation in the crown portion 26. Accordingly, the ridge can have a different composition than the rest of the crown portion 26 by spraying the two areas with metals of varying compositions. Additionally, a wood grain or marble veneer can be applied to the ridge 62 to enhance the cosmetic appeal of the casket 10.

Polymeric material 64, similar to the material 56 applied to the body containment compartment 12, is applied to the inner surface of the lid component (see FIG. 2). The lid component 14 is then removed from the mold 58 and buffed. Thereafter, the lid component is hingedly connected to the body containment compartment 12.

It should be noted that the body containment mold and the lid mold can be modified so as to be one uniform mold. This would allow the casket to be formed as a monolithic unit by the above mentioned process.

In the embodiment shown in FIG. 2*a*, the return flange 25 in the body containment compartment 12 has a groove 66 formed in opposite sides thereof. Similarly, the return flange 29 in the lid component has a groove 68 formed in opposite sides thereof. A magnetic strip 70 is positioned between the grooves 68 when the body containment compartment 12 and the lid component 14 are mated with one another. A magnetic strip 72 is similarly positioned between grooves 68. The magnetic strips lock the body containment compartment 12 and the lid component 14 to one another. The strips also create a tight seal between the compartment 12 and the component 14. The magnetic strips 70 and 72 are preferably comprised of an elastomeric material.

The aforementioned deposition process allows one to incorporate within the molded body containment compartment 12 or the lid component 14 marks of identification such as the name and/or any other inscriptions of a personal nature that may be appropriate. This can be achieved by securing the negative of the desired inscription in either mold 30 or 58 before the metal is deposited thereon.

Figure 1A:
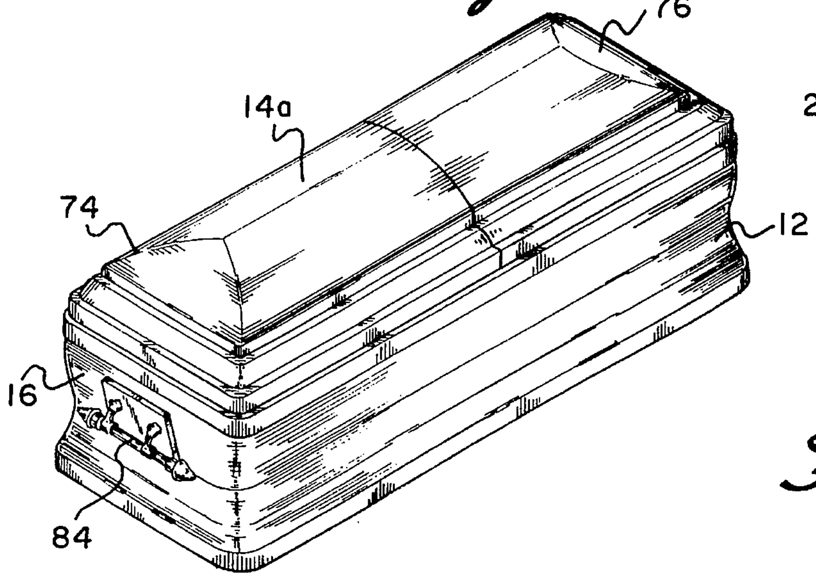
FIG. 1*a* is a perspective view of a half lid metal casket.
Figure 9:
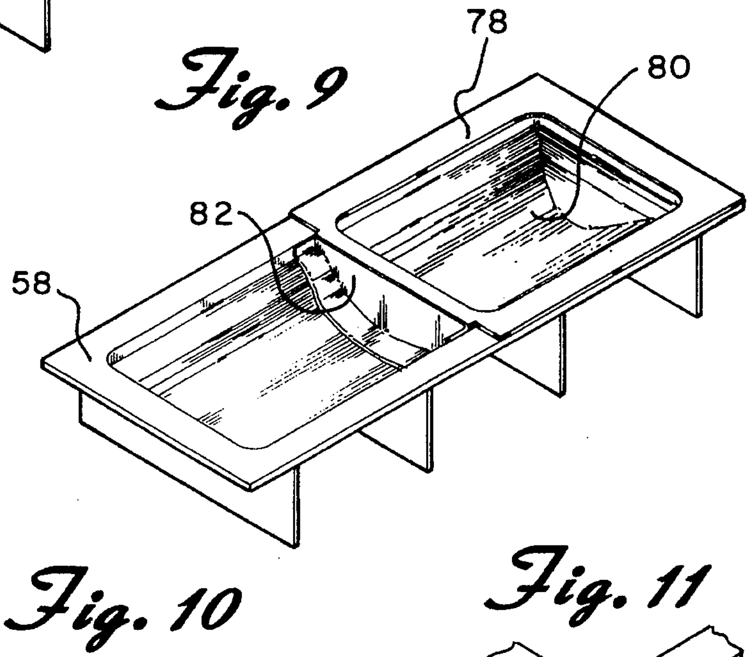
FIG. 9 is a perspective view of the lid mold with a half lid insert placed therein.
Figure 10:
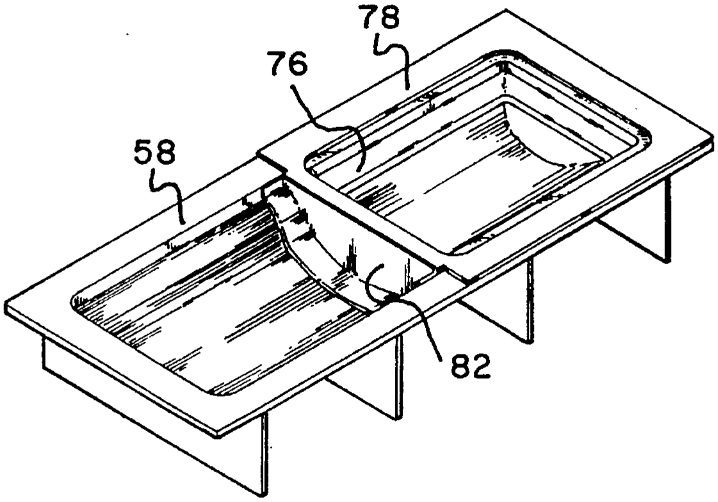
FIG. 10 is a perspective view of a lid mold with a metal half lid component deposited therein.

In an alternate embodiment, a lid component **14*a* is comprised of a first half lid section 74 and a second half lid section 76** (see FIG. 1*a*). Each of the sections is formed by placing a half lid insert 78 into the interior of mold 58 as shown in FIG. 9. The insert 78 preferably has a generally rectangular periphery with an opening 80 formed therethrough. A barrier 82 extends downwardly from one end of the insert 78. Metal is deposited inside the insert 78 to form one of the half lid sections 74 or 76 (see FIG. 10). After the section is formed, polymeric material is applied thereto and the section is removed from the mold 58. The same procedure is repeated to form the other half lid section.

Figure 3:
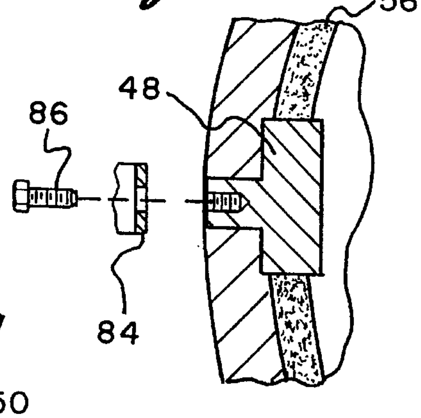
FIG. 3 is a partial cross-sectional view taken along line 3 of FIG. 2.

Upon completion of the body containment compartment 12 and the lid component 14 or **14*a*, as substantially described, the metal casket is finished by attaching both functional and ornamental hardware thereto. For example, handles 84 are securely attached to each of the ends 16 and 18 of the casket 10 as shown in FIG. 1. Preferably, this is accomplished by attaching a threaded fastener 86 to a corresponding handle 84 (see FIG. 3). Each of the fasteners 86 are then threaded into a corresponding threaded recess in the attachments 48 and 50 as shown in FIG. 2. Since the fasteners stay with the thickness of the attachments, there are no through holes in the body containment compartment 12** to allow for the entrance of unwanted environmental elements.

Figure 4:
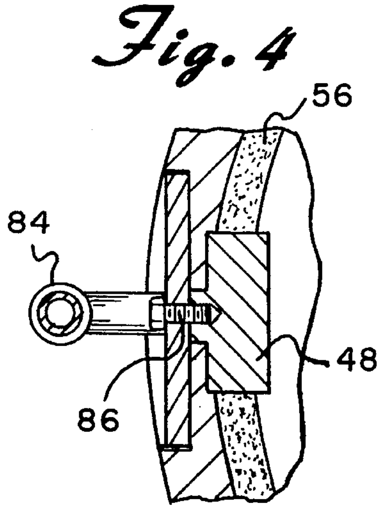
FIG. 4 is a view similar to FIG. 3 showing a handle secured in a recess in the body containment compartment.

It should be noted that the handles 84 can be secured flush with the outside of the body containment compartment 12 or secured in recesses formed therein during the deposition process (see FIG. 4). Additionally, handles can be similarly secured to the sides 20 and 22 of the casket 10. The inner portion of the metal casket, in its finished condition, can have linings and pillows (not shown) positioned therein.

Figure 11:
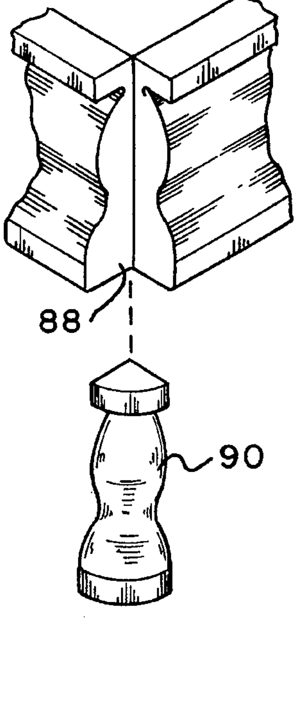
FIG. 11 is a partial view of a casket with a corner recess formed therein.

A distinct advantage of the molded metal process is the versatility one has in the making of the casket. For instance, a body containment mold can be utilized that allows a corner recess 88 to be formed on the body containment compartment when metal is deposited on the former (see FIG. 11). Corner hardware or insert 90 is then attached over the recess to give the desired appearance. Additionally, hardware can be formed to be integral with the body containment compartment by using an appropriate mold.

The present invention may be embodied in other specific forms without departing from the spirit or essential attributes thereof and accordingly reference should be made to the appended claims rather than to the foregoing specification as indicating the scope of the invention.

What is claimed is:

1. A method of fabricating a metal casket comprising the steps of:

providing a body containment mold and a lid mold, each of said molds having an inner surface;

applying a release mechanism to said inner surface of each of said molds;

forming a body containment compartment by spray depositing a layer of molten metal on said inner surface of said body containment mold until a desired thickness is achieved, said body containment compartment having an interior surface, an exterior surface and an upper edge;

forming a lid component by spray depositing a layer of molten metal on said inner surface of said lid mold until a desired thickness is achieved, said lid component having an interior surface;

allowing said layers of molten metal on said body containment compartment and said lid component to cool;

applying structural material to said interior surfaces of said body containment compartment and said lid component;

removing said body containment mold and said lid mold from said body containment compartment and said lid component, respectively, and hingedly connecting said lid component to said body containment compartment.

2. The method of claim 1 further including the steps of applying a reinforcement means to a portion of said body containment compartment after depositing an initial layer of molten metal and thereafter depositing further molten metal thereto to increase the torsional resistance of said compartment.

3. The method of claim 1 further including attaching a stiffener means to said upper edge of said body containment compartment for strengthening the same.

4. The method of claim 1 wherein said structural material is comprised of a polymer, said polymer being heated to a temperature above its melting point before application of the same to said body containment compartment and said lid component, said polymer being allowed to cool to a temperature below its melting point after application to said body containment compartment and said lid component.

5. The method of claim 1 further including the step of applying a plurality of attachments to the inner surface of the body containment mold before the step of applying said release mechanism.

6. The method of claim 5 wherein each of said attachments has a recess formed therein.

7. The method of claim 6 further including the steps of providing a plurality of pieces of hardware, and securing each of said pieces of hardware in a corresponding recess formed in each of said attachments.

* * * * *